United States Patent [19]

Payne et al.

[11] Patent Number: 4,680,689
[45] Date of Patent: Jul. 14, 1987

[54] THREE-PHASE AC TO DC POWER CONVERTER WITH POWER FACTOR CORRECTION

[75] Inventors: Donald W. Payne, 2450 Transit Ave., Anaheim, Calif. 92804; Bruce Hemp, La Mirada, Calif.

[73] Assignee: Donald W. Payne, Anaheim, Calif.

[21] Appl. No.: 573,086

[22] Filed: Jan. 23, 1984

[51] Int. Cl.$^4$ .................. H02M 1/12; H02M 7/155
[52] U.S. Cl. .................................... 363/26; 313/44; 313/11
[58] Field of Search ............... 363/2, 25, 26, 36, 37, 363/41, 71, 44, 27, 65, 87, 129, 69, 70, 3, 134

[56] References Cited

U.S. PATENT DOCUMENTS

| | | |
|---|---|---|
| 3,273,045 | 9/1966 | Benson . |
| 3,434,030 | 3/1969 | Bedford . |
| 3,838,330 | 9/1974 | Rosa . |
| 3,988,660 | 10/1976 | Ruch et al. . |
| 4,004,209 | 1/1977 | Lawson, Jr. . |
| 4,143,414 | 3/1979 | Brewster et al. ............... 363/44 |
| 4,245,288 | 1/1981 | McLyman ...................... 363/26 |
| 4,251,857 | 2/1981 | Shelly ............................. 363/26 |
| 4,270,165 | 5/1981 | Carpenter et al. . |
| 4,300,191 | 11/1981 | Baranowski et al. ........... 363/26 |
| 4,384,321 | 5/1983 | Rippel ............................. 320/21 |
| 4,447,695 | 5/1984 | Inoue ............................. 363/37 |

OTHER PUBLICATIONS

*Design and Manufacturing Guidelines*-NAVMA7 P4855-1, "Navy Power Supply Reliably", Department of the Navy, Dec., 1982.

Primary Examiner—Patrick R. Salce
Assistant Examiner—D. L. Rebsch

[57] ABSTRACT

A system for converting three-phase AC to DC voltage employs three separate converter circuits having their outputs connected in parallel to reduce current harmonics. Each converter circuit includes a full wave rectifier feeding a pulse width current modulator which modulates the DC current flow to the load in a manner to maintain the magnitude of the DC current proportional to the instantaneous magnitude of the DC voltage. The current modulators act as substantially resistive loads to reduce source current harmonics and correct the power factor. The modulators include a pair of transistors connected in a push-pull circuit which are controlled by an oscillator circuit to modulate the DC current at a frequency which is many orders of magnitude greater than the line frequency of the AC source. The DC current outputs of the modulators are coupled through DC/DC isolation transformers to the load.

2 Claims, 3 Drawing Figures 4,680,689

THREE-PHASE AC TO DC POWER CONVERTER WITH POWER FACTOR CORRECTION

DESCRIPTION

1. Technical Field

The present invention broadly relates to AC to DC power converters, and deals more particularly with a three phase AC to DC voltage converter which reduces current harmonics and corrects the power factor.

2. Background Art

Three-phase input AC to DC power converters find wide use in commercial and military applications, particularly those requiring high power levels. Three-phase converters are relatively simple in operation and produced fairly smooth DC current. Many applications for three-phase converters, particularly those of the military, dictate the need for a small, light weight converter package having high efficiency and low EMI (electromagnetic interference). Most AC to DC converters however, act as a non-linear load when operating from AC power systems. Non-linear loads generate harmonic currents which are fed back into the AC power distribution system where they create voltage drops across source impedances and line inductances, which in turn produce distortions of the voltage waveforms of the network. Although electronic equipment may be specially designed to accommodate voltage distortions to some extent, current harmonics can adversely affect equipment operation; for example, error may be introduced into electronic measuring devices, vibration modes may be set in rotating machinery which degrade bearings, and electrical-to-acoustical transformations may be created in ship hulls.

The DC voltage of a converter contains ripple components superimposed on an average DC voltage value. The ripple is made up of sine wave portions which include harmonic components that in turn result in the flow of harmonic currents into the DC circuit. As previously mentioned, the harmonic currents and voltages in the DC circuit can result in losses in the load and degradation of equipment performance.

Harmonic currents and voltages also act to reduce the power factor in a converter circuit. The power factor is the ratio of the true power (measured in watts) to the apparent power (total RMS volt-amperes). The power factor is a function of the amount of deviation of the line current from a sine wave due to harmonics. It is therefore highly desirable to correct the power factor in the converter in order to achieve maximum efficiency, i.e., the power factor should be as close to unity as possible.

Numerous solutions have been proposed in the past for reducing harmonics created by the rectification process. Low pass filters and series-tuned shunt filters (sometimes referred to as harmonic traps) have been devised but these filtering systems are undesirable in that they are extremely large and costly and also require individual sizing and design for each application.

Ferro-resonant transformers have been employed to reduce harmonics but such transformers are also large, heavy and require exceptionally massive resonant capacitors.

A more recent solution to the problem is proposed in U.S. Pat. No. 4,143,414 issued Mar. 6, 1979 to Brewster. This patent shows that harmonic currents are eliminated when single phase power is rectified into a resistive load. The three-phase converter disclosed in this patent employs three single phase rectifier circuits each of which operates a separate isolated resonant converter, and the outputs from each converter are recombined into a single DC output.

Each of the solutions proposed above is less than completely effective in reducing current and voltage harmonics and achieving a unity power factor. Moreover, the electrical components employed in previous converter systems are either quite costly to manufacture or are relatively large in volume.

DISCLOSURE OF THE INVENTION

It is therefore a primary object of the present invention to overcome each of the deficiencies inherent in the prior art converter systems discussed above.

Another object of the invention is to provide a three-phase AC to DC converter which presents a substantially resistive load to the AC power source in order to substantially eliminate current harmonics and correct the power factor.

A further object of the invention is to provide a converter as described above which eliminates the need for filtering circuits to purge harmonic components from the voltage and current.

Another object of the invention is to provide a converter as described above which is light weight, compact and achieves a power factor approaching unity.

A still further object of the invention is to provide a converter of the type mentioned above in which the power factor is closely controlled electronically.

Another object of the invention is to provide a converter as described above in which discrete quantities of electrical power are temporarily stored and transferred to the load at frequencies substantially greater than the line frequency of the AC source.

These, and further objects of the invention will be made clear or will become apparent during the course of the following description of a preferred embodiment of the invention.

According to one aspect of the present invention, a three-phase AC to DC voltage converter includes means for correcting the power factor and is adapted to be coupled between a three-phase AC voltage source and a load. The converter includes three single phase AC to DC converter circuits each of which includes a full wave rectifier, a DC current modulator and a DC/DC isolation transformer. Each rectifier converts a respective one of the phases of the three phase voltage to a full wave rectified DC voltage. The current modulator modulates the flow of the DC current in the corresponding phase in a manner to maintain the magnitude of the DC current proportional to the instantaneous magnitude of the DC voltage, thereby eliminating current harmonics and correcting the power factor. The isolation transformers couple the outputs of the respective current modulators to the load and isolate the load from the modulators. The outputs of the transformers are combined as a single DC current which is delivered to the load.

According to another aspect of the invention a method of converting three-phase AC to DC voltage is provided in which the power factor is substantially corrected and current harmonics are reduced, which comprises the steps of: individually rectifying each phase of the three-phase AC voltage to a full wave rectified DC voltage; producing a flow of DC current for each of the three phases using a corresponding DC voltage; periodically interrupting the flow of each DC current at a frequency much greater than the frequency of the AC voltage; accumulating the electrical energy produced by the DC current flow between successive interruptions thereof; and, transferring the accumulated electrical energy to a load while the DC current flow is interrupted.

BRIEF DESCRIPTION OF THE DRAWINGS

In the drawings, which form an integral part of the specification and are to be read in conjunction therewith, and in which like components are designated by identical reference numerals and in the various views.

BEST MODE FOR CARRYING OUT THE INVENTION

Figure 1:
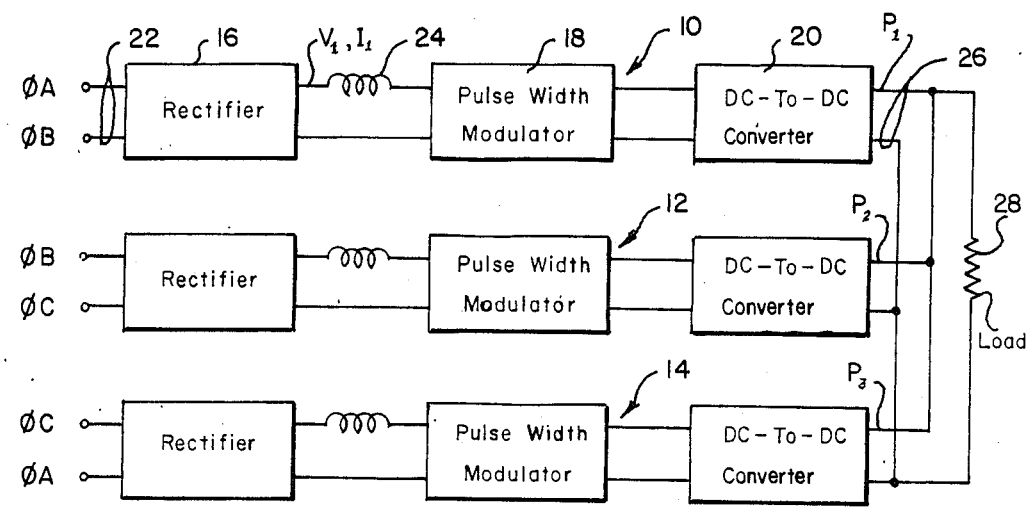
FIG. 1 is a combined block and schematic diagram of a three-phase AC to DC power converter having power factor correction which forms the preferred embodiment of the present invention.

Referring first to FIG. 1, the present invention generally relates to a three-phase AC to DC power converter which converts AC voltage from a three-phase AC source (not shown) to a DC voltage which is delivered to a load 28.

The converter broadly includes three converter circuits 10, 12, 14 which are connected in parallel relationship with each other between the three-phase AC source and the load 28. The converter circuits 10, 12, 14 are identical in construction, consequently only the details of converter circuit 10 will be discussed hereinbelow. The converter circuit 10 includes a pair of input leads 22 coupled with one phase of the three-phase source, i.e., 0A-OB. The converter circuit 10 broadly includes a rectifier 16, an energy storing inductor 24, a pulse width modulator 18 and a DC-to-DC transformer 20. The sinusoidal DC voltage on leads 22 is full wave rectified by rectifier 16; the output of rectifier 16 at $V_1$, $I_1$ consists of a full wave rectified DC voltage and current consisting of a series of half sine pulses which are depicted in the upper plot shown in FIG. 2. The pulse width modulator 18 effectively measures the instantaneous value of the pulsating DC voltage output by the rectifier 16 and modulates the flow of current from the inductor 24 to the load 28 through transformer 20 in a manner to maintain the DC current flow proportional to the instantaneous value of the DC voltage, $V_1$. The frequency at which the DC current is modulated by modulator 18 is substantially greater than that of the AC line voltage source. For example, modulator 18 may operate at a typical frequency of 40 KHz whereas the frequency of the AC line may be 60 or 400 Hz. The pulses of modulated DC current are coupled from the pulse width modulator 18 to the load 28 through transformer 20 which functions to electrically isolate the load 28 from modulator 18. The DC current output from each of the converter circuits 10, 12, 14 is combined and delivered to load 28.

Figure 2:
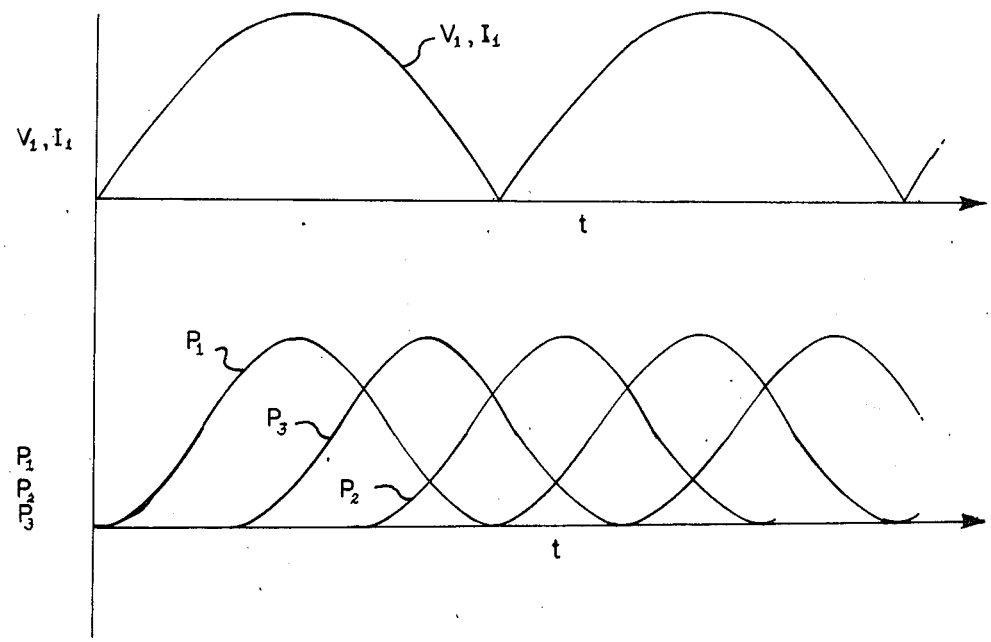
FIG. 2 displays graphical plots of waveforms produced by the converter shown in FIG. 1; and, FIG. 3 is a combined block and schematic diagram of the converter of FIG. 1, depicting the details of one of the converter circuits.

The power $P_1$, $P_2$, $P_3$ output from converter circuits 10, 12, 14 is depicted in the lower plot of FIG. 2 and defines an envelope which is a $sin^2$ function having a 60° shift between each curve of the envelope. Consequently, the corresponding current delivered through the load 28 is a substantially smooth DC current.

Figure 3:
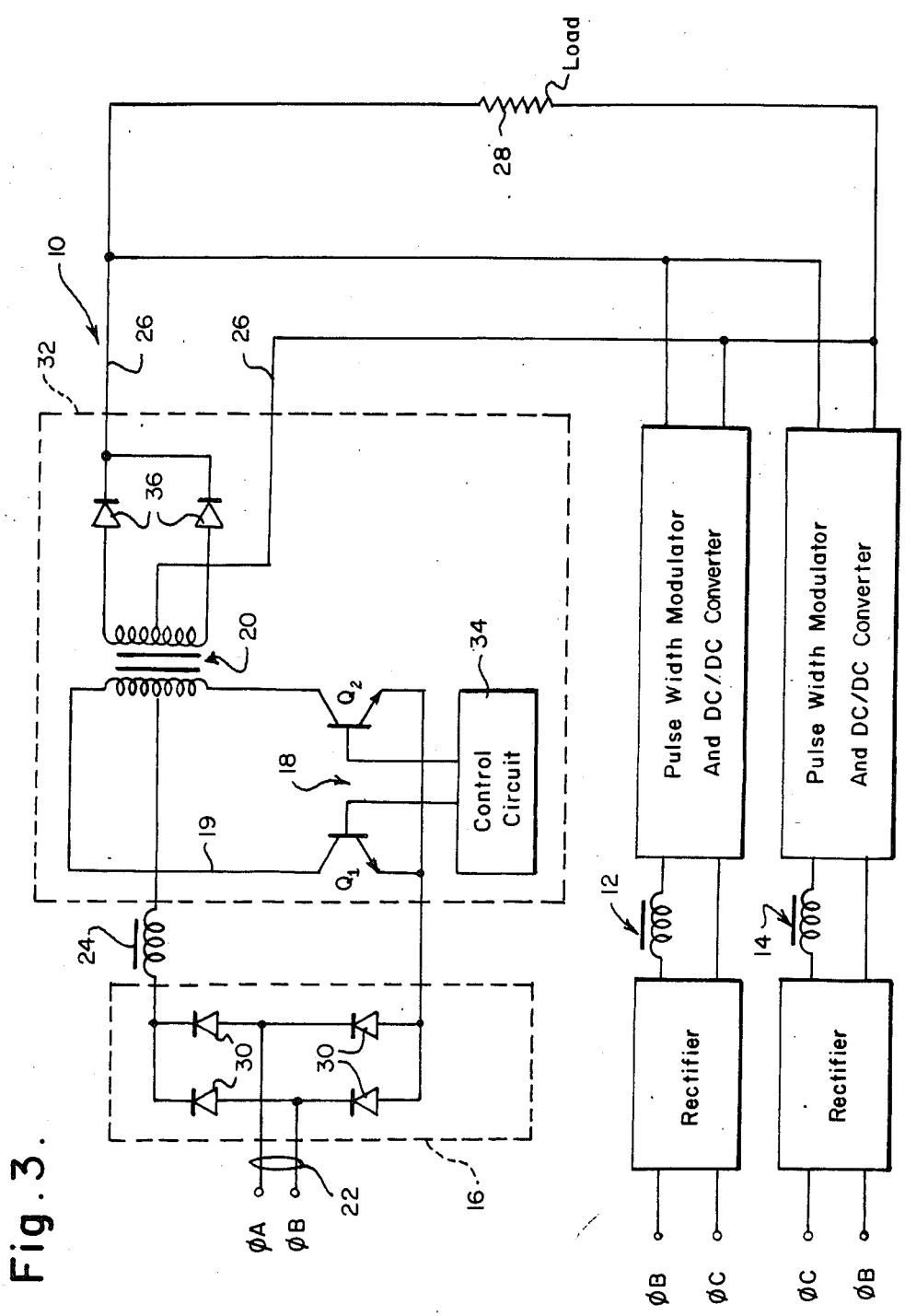

Referring now also to FIG. 3, rectifier 16 comprises four diodes 30 connected in a bridge circuit to provide full wave rectification of the incoming AC voltage present on lines 22. The output of rectifier 16 consists of a full wave rectified DC voltage which is impressed across inductor 24. Inductor 24 is connected in series with the pulse width modulator 18 and a portion of the primary of transformer 20 which are collectively identified within the broken line 32. More particularly, inductor 24 is connected in series with the center tap of the primary of transformer 20, the ends of the primary coil being connected in series with pulse width modulator 18. The pulse width modulator 18 includes a pair of npn transistors Q1 and Q2 and a control circuit 34. The collectors of transistors Q1 and Q2 are respectively connected to the ends of the primary of transformer 20, while the emitters thereof are each coupled in series with the rectifier 16. The bases of transistors Q1 and Q2 are connected to control circuit 34 which includes a timer or oscillator which may consist, for example, of a bistable multivibrator which outputs a train of timing pulses of preselected duration and frequency.

Transistors Q1 and Q2 are connected in a push-pull circuit configuration and operate in 180° phase relationship with each other. When a timing pulse is delivered by control circuit 34 to the base of transistor 31, a discrete quantity of DC current flows into the inductor 24 through the center tap of the primary 20 thence via line 19 through the collector to emitter path of transistor Q1 and returns to the rectifier 16. The next timing pulse is delivered to the base of transistor Q2 thus turning Q2 on and allowing DC current to flow into inductor 24 through the other half of the primary of transformer 20. The duration of each timing pulse may be, for example, two microseconds. At the commencement of each timing pulse when the corresponding transistor Q1, Q2 is switched on, the DC voltage output by rectifier 16 possesses an instantaneous value; at this point the DC current flowing through the primary of transformer 20 and inductor 24 builds up linearly to a preselected value commensurate with the duration with the timing pulse. The value of the incremental DC current flow is thus proportional to the instantaneous value of the DC voltage during the timing pulse.

The flow of DC current produced by each timing pulse results in power being accumulated and stored in the inductor 24. During the period between successive timing pulses from control circuit 34, the energy stored in inductor 24 flows through the primary of transformer 20 and is thus coupled to the load 28 through a pair of blocking diodes 36. The duration for which transistors Q1 or Q2 must remain off, i.e. the duration between successive timing pulses from control circuit 34, must be long enough to permit substantially the entire energy stored in inductor 24 to be transferred through transformer 20 to the load 28. For example if the timing pulses are of two microseconds each duration, the time between the pulses may be approximately ten microseconds. The pulse width modulator 18 effectively provides a method of controlling the amount of input DC current that is transferred to the load 28 through the isolation transformer 20. It is not necessary to measure the DC input voltage to the modulator in order to achieve DC current flow proportional to the DC voltage since the rate of increase in the DC current is automatically proportional to the instantaneous value of the DC voltage (the higher the DC voltage, the more quickly the DC current will build up).

By virtue of the linear manner in which the modulator 18 operates, the converter circuits 10, 12, 14 present a substantially resistive load to the AC voltage source, thus eliminating current and voltage harmonics. Also, the inductor 24 and the transformer 20 are relatively small in size and weight since they need only store and transfer small quantities of electrical energy at any given instant. However, because of the high operating frequency of the modulator 18, relatively large values of power may be converted. Moreover, by eliminating current and voltage harmonics as well as non-linearity in the DC current and voltage, the power factor of the converter remains substantially at unity.

INDUSTRIAL APPLICABILITY

The three-phase power converter described above is well adapted for use in numerous applications having high power requirements where achieving high efficiency is important while minimizing harmonic content and EMI. The converter of the present invention is especially simple in design and utilizes relatively small components thus making it ideal for applications requiring minimal size or weight.

The principles of the present invention may be readily adapted to convert DC to three-phase AC and can also be applied to conversion between AC to DC in single phase circuits.

From the foregoing, it is apparent that the three-phase AC to DC power converter described above not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

We claim:

1. A method of converting three-phase AC to DC voltage wherein the power factor is substantially corrected and current harmonics are reduced, comprising the steps of:
   (A) individually rectifying each phase of the three-phase AC voltage to form a full wave rectified variable voltage source;
   (B) generating a series of spaced apart timing pulses having a frequency substantially greater than the frequency of said AC voltage source;
   (C) using said timing pulses to control the flow of DC current from each full wave rectified variable voltage source to an energy storing inductor such that the flow of DC current to said inductor is linear and is proportional to the instantaneous magnitude of the variable voltage supplied by said voltage source; and,
   (D) successively transferring all of the energy stored in said inductor to a load in the time intervals between said timing pulses,
   steps (C) and (D) being performed such that the AC to DC voltage conversion results in a substantially resistive load being presented to said AC voltage source.

2. A three-phase AC to DC voltage converter including power factor correction and which is adapted to be coupled with a three-phase AC voltage source, comprising:
   three single phase AC to DC voltage converter circuits, each of said converter circuits including:
   a full wave rectifier for converting a respective one of the phases of said three-phase voltage source to a full wave rectified variable input voltage;
   an inductive element for storing electrical energy received from said rectifier connected between said rectifier and a pulse controlled switch;
   means for modulating the flow of current from said inductive element to the load, said modulation means including said pulse controlled switch for selectively connecting said inductive element with said load at spaced apart time intervals, the value of DC current delivered from said rectifier to said inductive element increasing linearly during each of said time intervals and being proportional in magnitude to the instantaneous value of said rectified variable voltage during the corresponding time interval, and means for applying control pulses to said switch means at a rate substantially greater than the frequency of said AC voltage source;
   said control pulses being sufficiently spaced apart in time to allow all of the energy stored in said inductive element to be transferred to the load by means of an isolation transformer between successive control pulses; and
   said converter circuits presenting a substantially resistive load to said AC voltage source.

* * * * *